United States Patent
Wang et al.

(10) Patent No.: US 7,380,042 B2
(45) Date of Patent: May 27, 2008

(54) METHOD OF DETECTING AND MONITORING MASTER DEVICE COMMUNICATION ON SYSTEM BUS

(75) Inventors: Ligong Wang, Round Rock, TX (US); Shiguo Luo, Austin, TX (US); Bruce A. Miller, Plano, TX (US)

(73) Assignee: Dell Products L.P., Round Rock, TX (US)

( * ) Notice: Subject to any disclaimer, the term of this patent is extended or adjusted under 35 U.S.C. 154(b) by 168 days.

(21) Appl. No.: 11/285,098

(22) Filed: Nov. 22, 2005

(65) Prior Publication Data

US 2007/0118673 A1    May 24, 2007

(51) Int. Cl.
*G06F 13/14* (2006.01)
*H03K 19/0175* (2006.01)

(52) U.S. Cl. .................. 710/305; 710/110; 710/316; 326/63; 713/340

(58) Field of Classification Search ........ 710/300–316, 710/8–19, 62–64, 72, 110; 713/330, 340; 326/63
See application file for complete search history.

(56) References Cited

U.S. PATENT DOCUMENTS

| | | | | |
|---|---|---|---|---|
| 4,689,740 A | * | 8/1987 | Moelands et al. | 713/600 |
| 5,128,557 A | * | 7/1992 | Milby et al. | 326/86 |
| 5,436,552 A | * | 7/1995 | Kajimoto | 323/313 |
| 5,561,391 A | * | 10/1996 | Wellnitz et al. | 327/309 |
| 5,948,077 A | * | 9/1999 | Choi et al. | 710/9 |
| 7,124,312 B2 | * | 10/2006 | Casebolt et al. | 713/323 |

OTHER PUBLICATIONS

System Management Bus Specification, Revision 1.0, Feb. 15, 1995, Benchmarq Microelectronics Inc. et al.

* cited by examiner

*Primary Examiner*—Raymond N Phan
(74) *Attorney, Agent, or Firm*—Haynes and Boone, LLP (57) ABSTRACT

A bus monitoring device includes a detector to detect a signal on the bus. The signal is initiated by one of a plurality of devices coupled to the bus. A clamp circuit is included to clamp the signal to a first predefined level in response to the signal being initiated by a first device of the plurality of devices. A comparator circuit compares the signal and a voltage reference to determine whether the first device initiated the signal.

17 Claims, 5 Drawing Sheets

METHOD OF DETECTING AND MONITORING MASTER DEVICE COMMUNICATION ON SYSTEM BUS

BACKGROUND

The present disclosure relates to the field of bus communications for information handling systems, and more particularly to identifying devices coupled to a bus.

As the value and use of information continues to increase, individuals and businesses seek additional ways to acquire, process and store information. One option available to users is information handling systems. An information handling system ('IHS') generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, entertainment, and/or global communications. In addition, information handling systems may include a variety of hardware and software components that may be configured to process, store, and communicate information and may include one or more computer systems, data storage systems, and networking systems.

A bus typically includes a plurality of conductors to electrically couple a plurality of devices. A data portion of the bus transfers actual data while an address portion of the bus directs the data to a predefined address. Typical examples of widely used buses in the personal computer industry include an I2C bus, a system management bus (SMbus), and an ACCESS bus. A technical specification entitled 'System Management Bus Specification', Revision 1.0, dated Feb. 15, 1995 describes additional details of the SMBus and is incorporated herein by reference. The SMBus is a popular derivative of the I2C bus and is, in most cases, compatible with the I2C bus. Both buses typically use a two-wire communication scheme and have at least one master device and one or more addressable slave devices. In a multi-master configuration, one or more masters co-exist on the bus at the same time without collision and/or data loss.

In a typical configuration of the SMBus/I2C bus, an input/output controller such as a keyboard controller (KBC) is configured as a master device operable to communicate with one or more rechargeable batteries equipped with electronic circuitry that is configured to operate as a slave. The KBC monitors and controls the operation of the one or more batteries. In a particular configuration, the SMBus/I2C bus may enable the batteries to operate as a master device and perform tasks such as broadcasting a signal. The broadcasted signal may include information such as battery status, manufacturer name, serial and model number, voltage, temperature and charge/discharge status.

Presently, tools and techniques available to monitor SMBus/I2C bus signals are unable to detect which master device originated a signal. That is, whether a signal on the SMBus/I2C bus was originated by the KBC or by another master device such as a battery. Such information is often desired to improve product reliability. For example, it may be desirable to identify potential counterfeit and/or non-compliant batteries that may not properly safeguard the charging process causing excessive heating during the charging process.

Therefore, a need exists for an improved method and system to identify an originating source of a message on a bus such as the SMBus/I2C bus. More specifically, a need exists to develop tools and techniques for distinguishing which one of a plurality of master devices coupled to the SMBus/I2C bus originated a signal. Accordingly, it would be desirable to provide for monitoring a bus included in an IHS, absent the disadvantages found in the prior methods discussed above.

SUMMARY

The foregoing need is addressed by the teachings of the present disclosure, which relates to monitoring a bus. According to one embodiment, a method for monitoring a bus includes, detecting a signal on the bus, comparing the signal with a reference value, and identifying a source originating the signal in response to the comparing.

DETAILED DESCRIPTION

Novel features believed characteristic of the present disclosure are set forth in the appended claims. The disclosure itself, however, as well as a preferred mode of use, various objectives and advantages thereof, will best be understood by reference to the following detailed description of an illustrative embodiment when read in conjunction with the accompanying drawings. The functionality of various circuits, devices, boards, cards, modules, blocks, and/or components described herein may be implemented as hardware (including discrete components, integrated circuits and systems-on-a-chip 'SOC'), firmware (including application specific integrated circuits and programmable chips) and/or software or a combination thereof, depending on the application requirements.

As described earlier, in a multi-master configuration of a bus, bus monitoring tools and techniques available presently are unable to detect which one of a plurality of master devices originated a signal. There is a need to properly identify the master device that is an originator for a signal on the bus to verify compliance and improve product safety and reliability.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, the IHS may be a personal computer, including notebook computers, personal digital assistants, cellular phones, gaming consoles, a network storage device, or any other suitable device and may vary in size, shape, performance, functionality, and price. The information handling system may include random access memory (RAM), one or more processing resources such as central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to receive/transmit communications between the various hardware components.

Figure 1:
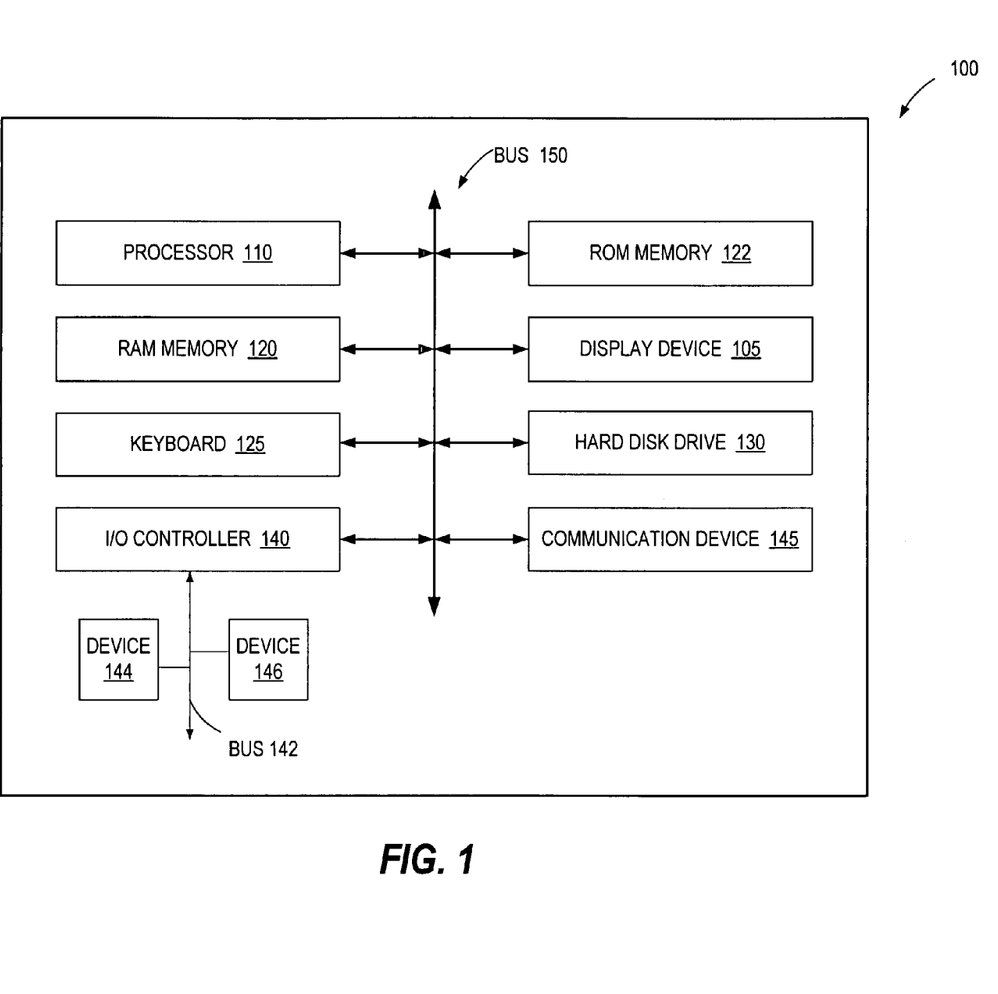
FIG. 1 illustrates a block diagram of an information handling system having an improved bus monitoring, according to an embodiment.

FIG. 1 illustrates a block diagram of an information handling system 100 with improved bus monitoring, according to an embodiment. The information handling system 100 includes a processor 110, a system random access memory (RAM) 120 (also referred to as main memory), a non-volatile ROM 122 memory, a display device 105, a keyboard 125 and an I/O controller 140 for controlling various other input/output devices. For example, the I/O controller 140 may include a keyboard controller (KBC), a cursor device controller and/or the serial I/O controller. It should be understood that the term "information handling system" is intended to encompass any device having a processor that executes instructions from a memory medium.

The IHS 100 is shown to include a hard disk drive 130 connected to the processor 110, although some embodiments may not include the hard disk drive 130. In a particular embodiment, the IHS 100 may include additional hard disks. The processor 110 communicates with the system components via a bus 150, which includes data, address and control lines. In one embodiment, the IHS 100 may include multiple instances of the bus 150. A communications device 145, such as a network interface card and/or a radio device, may be connected to the bus 150 to enable wired and/or wireless information exchange between the IHS 100 and other devices (not shown).

In a particular embodiment, the I/O controller 140 is coupled to another bus 142 such as the I2C bus, the SMbus, the ACCESS bus, and/or a similar bi-directional bus. A plurality of devices 144 and 146 are coupled to the bus 142. In one embodiment, the plurality of devices may include devices such as rechargeable batteries, power related integrated circuits, temperature sensors, and notebook lid switches. Additional detail of the bus 142 is described with reference to FIG. 2.

The processor 110 is operable to execute the computing instructions and/or operations of the IHS 100. The memory medium, e.g., RAM 120, preferably stores instructions (also known as a "software program") for implementing various embodiments of a method in accordance with the present disclosure. An operating system (OS) of the IHS 100 is a type of software program that controls execution of other software programs, referred to as application software programs. In various embodiments the instructions and/or software programs may be implemented in various ways, including procedure-based techniques, component-based techniques, and/or object-oriented techniques, among others. Specific examples include assembler, C, XML, C++ objects, Java and Microsoft Foundation Classes (MFC).

Figure 2:
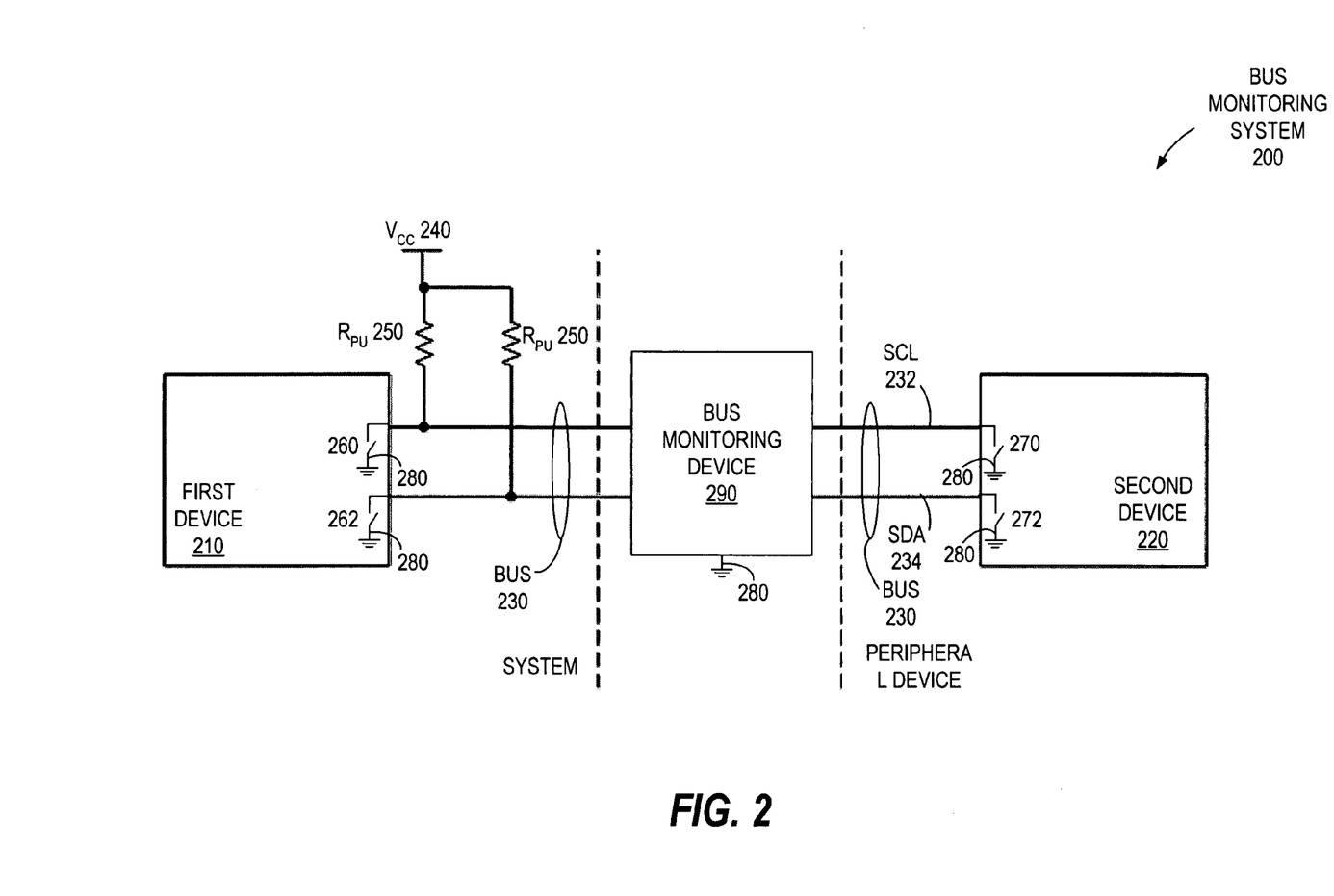
FIG. 2 illustrates a block diagram of a bus monitoring system, according to an embodiment.

FIG. 2 illustrates an architectural block diagram of a bus monitoring system 200, according to an embodiment. In the depicted embodiment, the bus monitoring system 200 includes a first device 210 coupled to a second device 220 via a bus 230. In a particular embodiment, the first device is the I/O controller 140, the bus 230 is the bus 142 and the second device 220 is one of the plurality of devices 144 and 146 described with reference to FIG. 1. In an embodiment, the first device 210 is a master device and the second device 220 may be configured to be a slave device or another master device. When the second device 220 operates as a master device, the first device 210 operates as a slave device. Although the bus monitoring system 200 illustrates two devices 210 and 220 in the depicted embodiment for clarity, other embodiments having more than two devices are contemplated. In a particular embodiment, the first device 210 is the I/O controller 140 such as an embedded controller or a keyboard controller and the second device 220 is a rechargeable battery.

In the depicted embodiment, the bus 230 includes two wires, conductors and/or lines for carrying a clock SCL 232 and data SDA 234. A voltage $V_{CC}$ 240 provides power to the SCL 232 and SDA 234 lines via pull-up resistors $R_{PU}$ 250. Typical values for $V_{CC}$ 240 may be selected to be 3 volts or 5 volts, depending on the bus standard.

In a particular embodiment, signal levels on the bus 230 may vary between a logic high and a logic low, with the logic high being the default level. That is, the first device 210 and/or the second device 220 may generate a signal by pulling one of the SCL 232 and data SDA 234 lines from a logic high to a logic low. The particular voltage values for the logic high and the logic low may be dependent on the bus standard and may be nominally set to 3 volts or 5 volts and 0 volts respectively. In the depicted embodiment, any one of the first device 210 and the second device 220 may send a signal on the SCL 232 line by respectively closing a first switch 260 and a second switch 270. Closing the switch provides a conductive path from $V_{CC}$ 240, $R_{PU}$ 250, the first switch 260 or the second switch 270 to a ground reference 280, which is the logic low. A similar pair of switches 262 and 272 may be closed to send a signal on the SDA 234 line. Additional details of the signals on the bus 230 are described with reference to FIG. 4.

A bus monitoring device 290 is operable to detect which one of the first device 210 and the second device 220 initiates a signal on the bus 230. The bus monitoring device 290 is electrically coupled in series with the SCL 232 and data SDA 234 lines. In the depicted embodiment, the bus monitoring device 290 is coupled to the ground reference 280. In an exemplary, non-depicted embodiment, the bus 230 may couple more than two devices. In this embodiment, a bus monitoring device corresponding to each device is operable to detect which device initiated a signal. Additional details of the bus monitoring device 290 are described with reference to FIG. 3.

Figure 3:
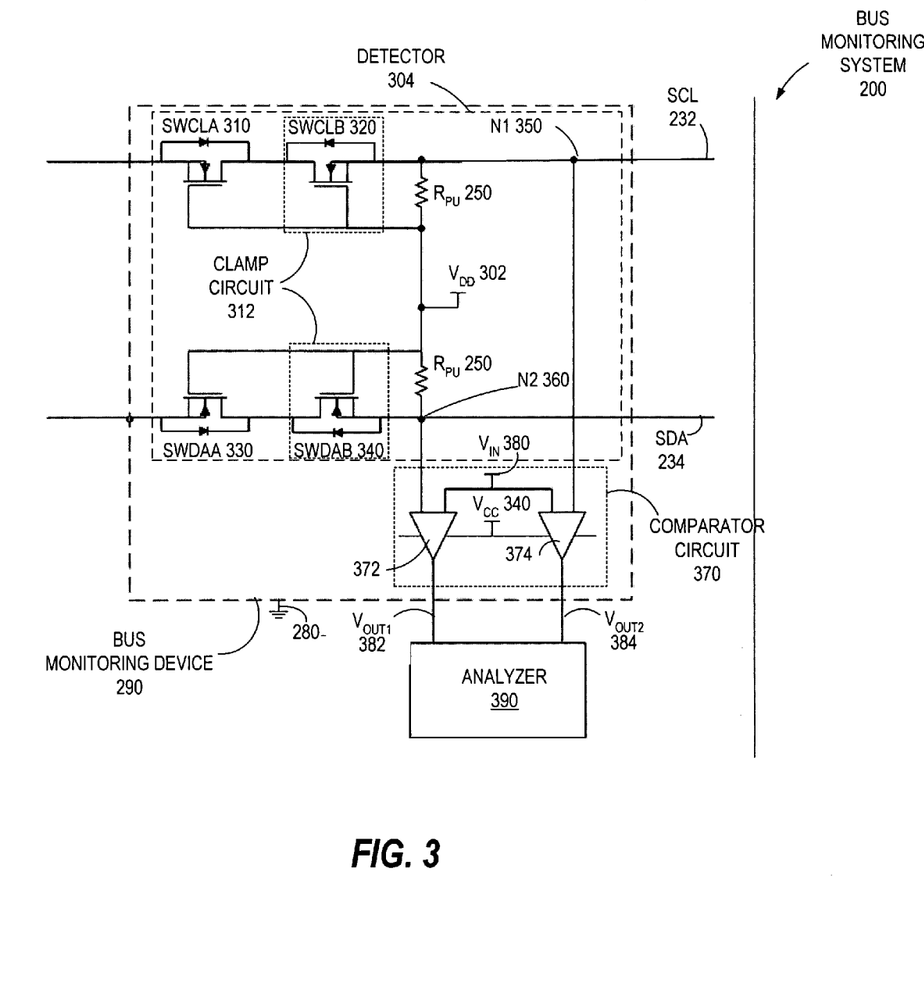
FIG. 3 is a block diagram illustrating further details of a bus monitoring device described with reference to FIG. 2, according to an embodiment.

FIG. 3 is a block diagram illustrating further details of the bus monitoring device 290 described with reference to FIG. 2, according to an embodiment. In the depicted embodiment, the bus monitoring device 290 includes a detector 304 to detect a signal initiated by one of the first device 210 or the second device 220, a clamp circuit 312 to clamp the detected signal to a predefined value, and a comparator circuit 370 to compare the signal with a reference voltage $V_{IN}$ 380.

The detector 304 detects which one of the switches 260, 270, 262 or 272 is closed and in response to the closure a current flows through a corresponding conductive path through the closed switch. A plurality of switches SWCLA 310 and SWCLB 320 are coupled in series with the SCL 232 line. Similarly, a plurality of switches SWDAA 330 and SWDAB 340 are coupled in series with the SDA 234 line. The pair of switches SWCLA 310/SWCLB 320 and SWDAA 330/SWDAB 340 are provided to balance circuit components of the bi-directional bus. A voltage $V_{DD}$ 302 is coupled to the gate of each one of the switches 310, 320, 330 and 340 to provide a control signal. A value of the $V_{DD}$ 302 is nominally set to a logic high, e.g., 3 volts or 5 volts. Thus, each one of the switches 310, 320, 330 and 340 are always conducting. Pull-up resistors $R_{PU}$ 250 limit the value of current flowing on lines SCL 232 and SDA 234. A value for the pull-up resistor $R_{PU}$ 250 is selected to be approximately in the 1K to 10K ohm range but may vary depending on the bus standard.

In a particular embodiment, each one of the switches 310, 320, 330 and 340 are N-FET switches having a body diode. In an embodiment, a clamp circuit 312 includes the two switches 320 and 340. In a conducting state, a voltage drop across the body diode is substantially fixed or clamped to a first predefined value. In a particular embodiment, a nominal value for the first predefined value is approximately 0.7 volts. The clamp circuit 312 thus provides a digital signature to uniquely identify the first device 210 by adding a known voltage bias while being in compliance with the logic low standard.

When the switch 260 is closed by the first device 210, the detector 304 detects that the SCL 232 line is grounded due to a conductive path from the $V_{DD}$ 302, $R_{PU}$ 250, SWCLA 310, SWCLB 320, switch 260 and the ground reference 280. When $V_{DD}$ 302 is 3 volts, the voltage drop across the switch SWCLB 320 is approximately 0.7 volts, and the voltage drop across the pull-up resistor $R_{PU}$ 250 is approximately 2.3 volts. Thus, voltage at node N1 350 is approximately 0.7 volts. Similarly, when the switch 262 is closed by the first device 210, the detector 304 detects that the SDA 234 line is grounded due to a conductive path from the $V_{DD}$ 302, $R_{PU}$ 250, SWDAA 330, SWDAB 340, switch 262 and the ground reference 280. The voltage at node N2 360 is approximately 0.7 volts, which is the voltage drop across the body diode of the switch SWDAB 340.

When the switch 270 is closed by the second device 220, the detector 304 detects that the SCL 232 line is grounded due to a conductive path from the $V_{DD}$ 302, $R_{PU}$ 250, switch 270 and the ground reference 280. Thus, voltage at node N1 350 is the same as the ground reference 280, e.g., substantially equal to 0 volts. Similarly, when the switch 272 is closed by the second device 220, the detector 304 detects that the SDA 234 line is grounded due to a conductive path from the $V_{DD}$ 302, $R_{PU}$ 250, switch 272 and the ground reference 280. Thus, voltage at node N2 360 is the same as the ground reference 280, e.g., substantially equal to 0 volts.

In the depicted embodiment, a comparator circuit 370 includes a first comparator 372 and a second comparator 374. In the depicted embodiment, the comparator circuit 370 is powered by $V_{CC}$ 340. The first comparator 372 compares voltage at node N2 360 to a reference voltage $V_{IN}$ 380 and generates $V_{OUT1}$ 382 as an output. The second comparator 374 compares voltage at node N1 350 to the reference voltage $V_{IN}$ 380 and generates $V_{OUT2}$ 384 as an output. When the first device 210 initiates a signal on the SCL 232 line, then voltage at the node N1 350 is greater than the reference voltage $V_{IN}$ 380 and a $V_{OUT2}$ 384 is high. When the first device 210 initiates a signal on the SDA 234 line, then voltage at the node N2 360 is greater than the reference voltage $V_{IN}$ 380 and a $V_{OUT1}$ 382 is high.

Similarly, when the second device 220 initiates a signal on the SCL 232 line, then the node N1 350 is coupled to the ground reference 280 and the voltage at N1 350 is less than the reference voltage $V_{IN}$ 380 and $V_{OUT2}$ 384 is low. When the second device 220 initiates a signal on the SDA 234 line, then voltage at the node N2 360 is less than the reference voltage $V_{IN}$ 380 and $V_{OUT1}$ 382 is low. Thus, a determination is made whether the first device 210 initiated a signal or the second device 220 initiated the signal by comparing an output of the comparator circuit 370, e.g., $V_{OUT1}$ 382 and $V_{OUT2}$ 384, with a logic high or a logic low respectively. In a particular embodiment, the $V_{OUT1}$ 382 and the $V_{OUT2}$ 384 are provided to an analyzer 390.

Figure 4:
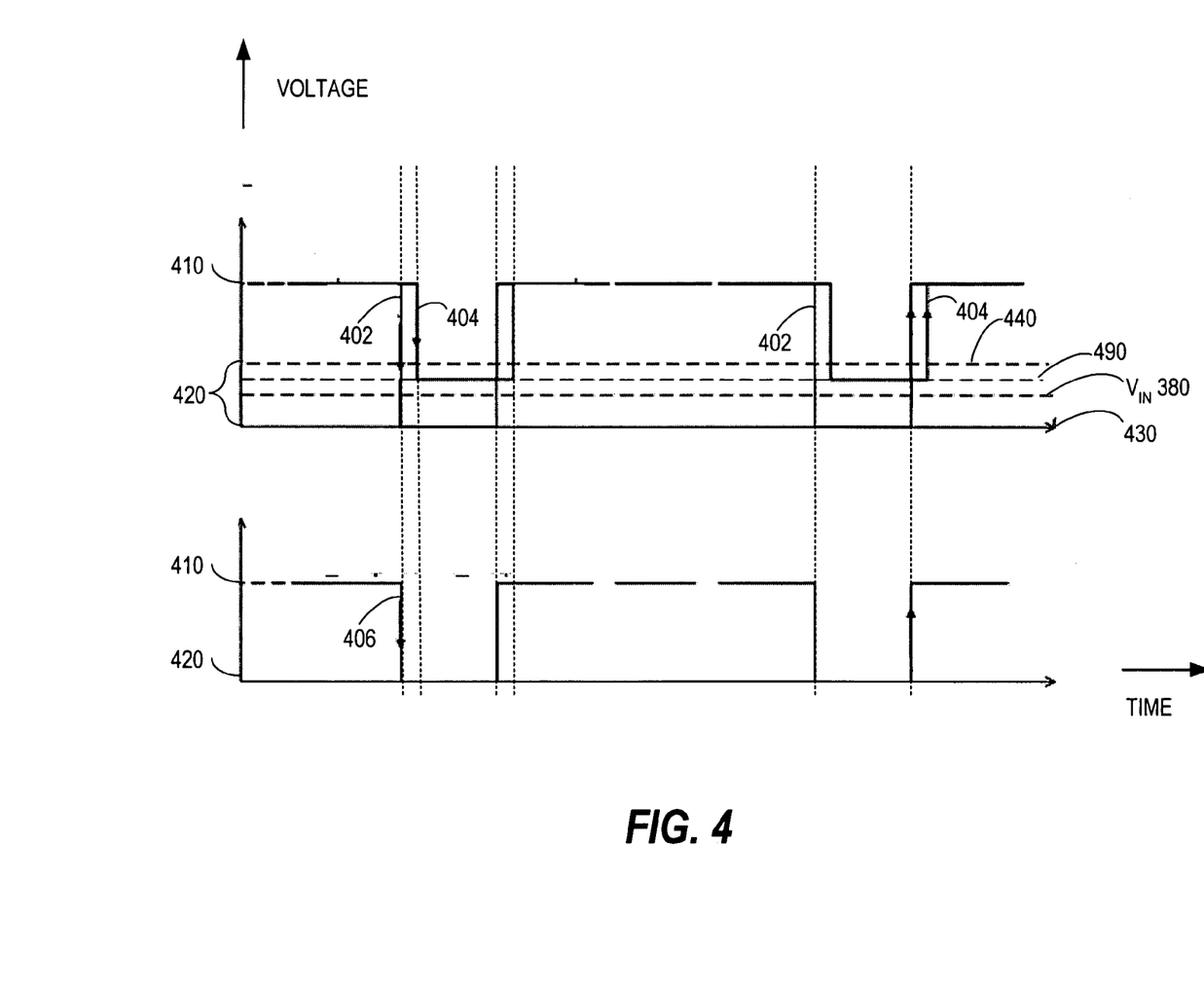
FIG. 4 is a waveform illustrating further details of signals on a bus described with reference to FIG. 2, according to an embodiment.

FIG. 4 is a waveform illustrating further details of signals 402 and 404 on a bus 230 described with reference to FIG. 2, according to an embodiment. In the depicted embodiment, the waveform illustrates signals 402 and 404 transitioning between a logic high 410 and a logic low 420 as a function of time (X axis). For the selected bus standard, the logic high 410 is nominally 3 volts (shown as a voltage on Y axis) and the logic low 420 may vary between a lower logic low voltage 430 and an upper logic low voltage 440. In the depicted embodiment, nominal voltage values for the lower logic low voltage 430 and an upper logic low voltage 440 are selected as ground reference 280, e.g., 0 volts and 0.8 volts respectively. In a particular embodiment, the reference voltage $V_{IN}$ 380 is selected as an average of the lower logic low voltage 430 and an upper logic low voltage 440, which is nominally 0.4 volts. In another embodiment, a nominal voltage value for the reference voltage $V_{IN}$ 380 may be set at 0.5 volts.

In the depicted embodiment, the signal 402 is initiated by the second device 220 and varies between the logic high 410 and the lower logic low voltage 430 of 0 volts. The signal 404 is initiated by the first device 210 and varies between the logic high 410 and a first predefined value 490 having a nominal value of 0.7 volts. As described earlier with reference to FIG. 3, the first predefined value 490 of approximately 0.7 volts is defined as the predefined voltage drop across the body diode included in the clamp circuit 312. The first predefined value 490 is the clamped value for the signal initiated by the first device 210. The first predefined value 490 is greater than the reference voltage $V_{IN}$ 380 but is less than the upper logic low voltage 440 nominally set at 0.8 volts.

In the depicted embodiment, a signal 406 illustrates an output signal on the bus 230 after the comparator circuit 370 filters out the signal 404 initiated by the first device 210. By filtering out the signal initiated by the first device 210 (such as a keyboard controller) the analyzer 390 is enabled to monitor message traffic initiated by other master devices such as the second device 220. After filtering, the signal 406 is substantially the same as the signal 402.

Figure 5:
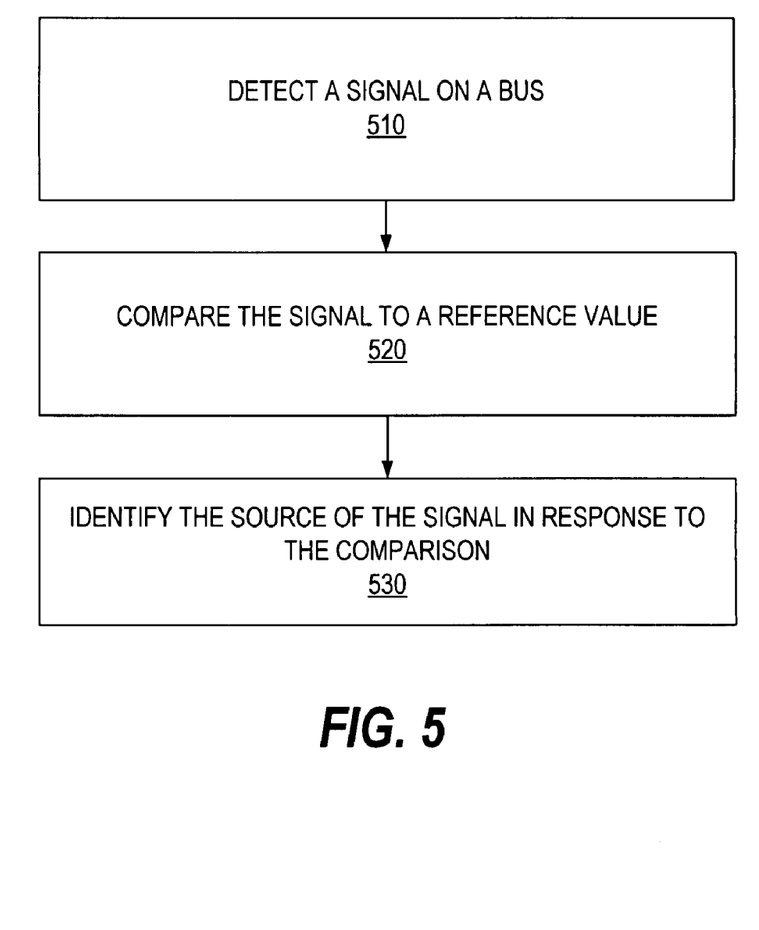
FIG. 5 is a flow chart illustrating a method monitoring a bus, according to an embodiment.

FIG. 5 is a flow chart illustrating a method for monitoring a bus, according to an embodiment. In step 510, a signal is detected on a bus. In a particular embodiment, the bus is the bus 230 described with reference to FIG. 2. In step 520, the signal is compared with a reference value. In step 530, a source originating the signal is identified in response to the comparison.

Various steps described above may be added, omitted, combined, altered, or performed in different orders. For example, the step 510 may be omitted by continuously comparing the signal with the reference value.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein. In the claims, means-plus-function clauses are intended to cover the structures disclosed herein as performing the related function and not only structural equivalents, but also equivalent structures.

What is claimed is:

1. A bus monitoring device comprising:
   a detector to detect a signal on the bus, wherein the signal is initiated by one of a plurality of devices coupled to the bus
   a clamp circuit to clamp the signal to a first predefined level in response to the signal being initiated by a first device of the plurality of devices; and
   a comparator circuit to compare the signal and a voltage reference to determine whether the first device initiated the signal;
   wherein the signal is initiated by transitioning from a logic high to a logic low, wherein the logic low varies between an upper logic low voltage and a lower logic low voltage, wherein the first predefined level is less than the upper logic low voltage and greater than the lower logic low voltage; and
   wherein the voltage reference is an average of the upper logic low voltage and the lower logic low voltage.

2. The device of claim 1, wherein the signal is substantially equal to the lower logic low when another device that is different than the first device initiates the signal.

3. The device of claim 1, wherein the first device provides a conductive path to at least one of the conductors of the bus to the lower logic low voltage by operating a switch, wherein the conductive path causes the signal to transition from the logic high to the logic low.

4. The device of claim 1, the bus is included in an information handling system (IHS).

5. The device of claim 1, wherein the clamp circuit includes a plurality of switches each having a body diode, wherein a voltage drop across the body diode is substantially equal to the first predefined level.

6. The device of claim 1, each one of the plurality of switches is always conducting.

7. The device of claim 1, wherein the clamp circuit is bypassed in response to the signal being initiated by another device of the plurality of devices that is different than the first device.

8. The device of claim 1, wherein each one of the plurality of devices has a corresponding detector, clamp circuit and comparator circuit.

9. A bus monitoring device comprising:
   a detector to detect a signal on the bus, wherein the signal is initiated by one of a plurality of devices coupled to the bus;
   a clamp circuit to claim the signal to a first predefined level in response to the signal being initiated by a first device of the plurality of devices; and
   a comparator circuit to compare the signal and a voltage reference to determine whether the first device initiated the signal,
   wherein each one of the plurality of devices is configured to operate as a master device, wherein the first device is an embedded controller, and wherein another device that is different than the first device is a battery.

10. A bus monitoring device comprising:
    a detector to detect a signal on the bus, wherein the signal is initiated by one of a plurality of devices coupled to the bus;
    a clamp circuit to claim the signal to a first predefined level in response to the signal being initiated by a first device of the plurality of devices; and
    a comparator circuit to compare the signal and a voltage reference to determine whether the first device initiated the signal,
    wherein the bus conforms to one of an SMBus, a I2C bus and an ACCESS standard.

11. A method for monitoring a bus, the method comprising:
    detecting a signal on the bus;
    comparing the signal with a reference value; and
    identifying a source originating the signal in response to the comparing,
    wherein the originating source is a second master device coupled to the bus when the signal is less than the reference value and wherein the second master device is a battery.

12. The method of claim 11, wherein the source is a first master device coupled to the bus when the signal exceeds the reference value, wherein the first master device is a keyboard controller.

13. A method for monitoring a bus, the method comprising:
    detecting a signal on the bus;
    comparing the signal with a reference value; and
    identifying a source originating the signal in response to the comparing,
    wherein the bus conforms to one of an SMBus a I2C bus and an ACCESS standard.

14. The method of claim 11, wherein the signal varies between a logic high and a logic low, wherein the logic low varies between a lower logic low voltage and an upper logic low voltage, and wherein the reference value is an average of the upper logic low voltage and the lower logic low voltage.

15. An information handling system (IHS) comprising:
    a processor; and
    an input/output (I/O) controller coupled to the processor, wherein the I/O controller controls a bus, wherein a monitoring device to monitor the bus includes:
    a detector to detect a signal on the bus, wherein the signal is initiated by one of a plurality of devices coupled to the bus;
    a clamp circuit to clamp the signal to a first predefined level in response to the signal being initiated by the I/O controller; and
    a comparator circuit to compare the signal and a voltage reference to determine whether the I/O controller initiated the signal,
    wherein the bus conforms to one of an SMBus, a I2C bus and an ACCESS standard.

16. An information handling system (IHS) comprising:
    a processor; and
    an input/output (I/O) controller coupled to the processor wherein the I/O controller controls a bus, wherein a monitoring device to monitor the bus includes:
    a detector to detect a signal on the bus, wherein the signal is initiated by one of a plurality of devices coupled to the bus;

a claim circuit to clamp the signal to a first predefined level in response to the signal being initiated by the I/O controller; and a comparator circuit to compare the signal and a voltage reference to determine whether the I/O controller initiated the signal, wherein each one of the plurality of devices is a master device and wherein another device that is different than the I/O controller is a battery.

17. An information handling system (IHS) comprising:

a processor; and an input/output (I/O) controller coupled to the processor, wherein the I/O controller controls a bus, wherein a monitoring device to monitor the bus includes:

means for detecting a signal on the bus, wherein the signal is initiated by one of a plurality of devices coupled to the bus;

means for clamping the signal to a first predefined level in response to the signal being initiated by the I/O controller; and means for comparing the signal and a voltage reference to determine whether the I/O controller initiated the signal, wherein the bus conforms to one of an SMBus, a I2C bus and an ACCESS standard, wherein each one of the plurality of devices is a master device, and wherein another device that is different than the I/O controller is a battery.

* * * * *

UNITED STATES PATENT AND TRADEMARK OFFICE
CERTIFICATE OF CORRECTION

PATENT NO.         : 7,380,042 B2                                     Page 1 of 1
APPLICATION NO.   : 11/285098
DATED              : May 27, 2008
INVENTOR(S)       : Ligong Wang et al.

It is certified that error appears in the above-identified patent and that said Letters Patent is hereby corrected as shown below:

Claim 1, Column 7, Lines 15-16, after the word bus insert --;--.

Signed and Sealed this

Third Day of March, 2009

JOHN DOLL
*Acting Director of the United States Patent and Trademark Office*